United States Patent
Hasegawa

(10) Patent No.: US 9,339,702 B2
(45) Date of Patent: May 17, 2016

(54) SHAFT FOR GOLF CLUBS

(71) Applicant: DUNLOP SPORTS CO. LTD., Kobe-shi, Hyogo (JP)

(72) Inventor: Hiroshi Hasegawa, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 0 days.

(21) Appl. No.: 14/450,824

(22) Filed: Aug. 4, 2014

(65) Prior Publication Data

US 2015/0038255 A1    Feb. 5, 2015

(30) Foreign Application Priority Data

Aug. 5, 2013 (JP) .................... 2013-161939

(51) Int. Cl.
| | |
|---|---|
| *A63B 53/10* | (2015.01) |
| *B29C 70/54* | (2006.01) |
| *B29C 70/30* | (2006.01) |
| *B29L 31/52* | (2006.01) |

(52) U.S. Cl.
CPC .................. *A63B 53/10* (2013.01); *B29C 70/30* (2013.01); *B29C 70/541* (2013.01); *A63B 2209/02* (2013.01); *B29L 2031/5227* (2013.01)

(58) Field of Classification Search
CPC .... A63B 53/10; A63B 2209/02; B29C 70/00; B29C 70/541; B29C 70/30; B29L 2031/5227
See application file for complete search history.

(56) References Cited

U.S. PATENT DOCUMENTS

| | | | | |
|---|---|---|---|---|
| 5,265,872 A | * | 11/1993 | Tennent | A63B 53/10 273/DIG. 23 |
| 5,620,380 A | * | 4/1997 | Tennent | A63B 53/10 273/DIG. 23 |
| 5,626,529 A | * | 5/1997 | Roy | A63B 53/10 156/188 |
| 5,685,783 A | * | 11/1997 | Akatsuka | A63B 53/10 273/DIG. 23 |
| 6,273,830 B1 | * | 8/2001 | Takemura | A63B 53/10 428/36.9 |
| 6,306,047 B1 | * | 10/2001 | Kusumoto | A63B 53/10 428/36.3 |
| 6,354,957 B1 | | 3/2002 | Saito | |
| 2003/0083143 A1 | * | 5/2003 | Kumamoto | A63B 53/10 473/289 |
| 2003/0125125 A1 | | 7/2003 | Oyama | |
| 2012/0309558 A1 | | 12/2012 | Nakano | |
| 2013/0029781 A1 | * | 1/2013 | Beno | A63B 53/10 473/345 |

* cited by examiner

*Primary Examiner* — Stephen Blau
(74) *Attorney, Agent, or Firm* — Birch, Stewart, Kolasch & Birch, LLP

(57) ABSTRACT

A shaft 6 includes bias layers and straight layers. The bias layers include full length bias layers s1, s2, and butt partial bias layers s3, s4 arranged at a butt end side of the shaft. The straight layers include full length straight layers s7, s9, a tip partial straight layer arranged at a tip side of the shaft, and a butt partial straight layer arranged at a butt end side of the shaft. The tip partial straight layer includes a tip low-elastic layer s6. The butt partial straight layer includes a butt low-elastic layer s8. A low-elastic layer means a layer in which an elastic modulus of a reinforcing fiber is equal to or less than 20 ton/mm$^2$. A shaft length Ls is equal to or less than 41 inches.

6 Claims, 3 Drawing Sheets

SHAFT FOR GOLF CLUBS

The present application claims priority on Patent Application No. 2013-161939 filed in JAPAN on Aug. 5, 2013, the entire contents of which are hereby incorporated by reference.

BACKGROUND OF THE INVENTION

1. Field of the Invention

The present invention relates to a shaft for golf clubs.

2. Description of the Related Art

Stability of a hit ball direction is required for a shaft for golf clubs. In particular, the tendency is strong in a comparatively short shaft. Flight distance performance is required for the shaft for golf clubs. A lightweight shaft is useful to improve the flight distance performance.

Japanese Patent Application Laid-Open No. 10-328340 (U.S. Pat. No. 6,354,957) discloses a shaft including a body layer obtained by winding a first fiber reinforced prepreg, and an adjusting layer obtained by winding a second fiber reinforced prepreg. The adjusting layer is provided at an inner side of the body layer, or in the middle of the body layer. The second fiber reinforced prepreg has a higher specific gravity and lower elasticity as compared with the first fiber reinforced prepreg. The volume of the adjusting layer is 10 to 90% based on the entire shaft. The gazette describes that a reinforcing fiber of the adjusting layer may be a glass fiber.

Japanese Patent Application Laid-Open No. 2012-245309 (US2012/0309558) discloses a shaft including a partial layer partially arranged in an axial direction of the shaft. The partial layer includes a butt end reinforced bias layer and a butt end reinforced hoop layer. In the shaft, a torsional rigidity value GIt in a point separated by 300 mm from a butt end is set to a predetermined range.

Japanese Patent Application Laid-Open No. 2003-190341 (US2003/0125125) discloses a shaft including a TIP side angle reinforced layer. In the shaft, weight saving and a low torque can be achieved. In the shaft, stability of a hit ball direction and an improvement in a flight distance can be realized.

SUMMARY OF THE INVENTION

A shaft having excellent flight distance performance and high stability of a hit ball direction is preferable. Performance required for a shaft has been increased.

It is an object of the present invention to provide a golf club shaft having higher performance.

A preferable shaft includes a bias layer and a straight layer. The bias layer includes a butt partial bias layer arranged at a butt end side of the shaft. The straight layer includes a tip partial straight layer arranged at a tip side of the shaft and a butt partial straight layer arranged at the butt end side of the shaft. If a layer in which an elastic modulus of a reinforcing fiber is equal to or less than 20 ton/mm$^2$ is defined as a low-elastic layer, the tip partial straight layer includes a tip low-elastic layer. The butt partial straight layer includes a butt low-elastic layer. A shaft length Ls is equal to or less than 41 inches.

Preferably, the tip low-elastic layer and the butt low-elastic layer are glass fiber reinforced layers. A total weight of the glass fiber reinforced layers is defined as Wg and a shaft weight is defined as Ws. Preferably, Wg/Ws is less than 0.10.

Preferably, the tip low-elastic layer and the butt low-elastic layer are glass fiber reinforced layers. A portion between a position separated by 90 mm from a tip of the shaft and the tip of the shaft is defined as a specific tip end part. A portion between a position separated by 50 mm from a butt end of the shaft and the butt end of the shaft is defined as a specific butt end part. A weight of the specific tip end part is defined as Wt. A weight of the specific butt end part is defined as Wb. A weight of the tip low-elastic layer in the specific tip end part is defined as Wt1. A weight of the butt low-elastic layer in the specific butt end part is defined as Wb1. Preferably, Wb1/Wb is greater than Wt1/Wt.

Preferably, Wt1/Wt is 0.05 or greater and 0.20 or less. Preferably, Wb1/Wb is 0.07 or greater and 0.25 or less.

Preferably, an axial direction distance Lg between a tip of the shaft and a center of gravity of the shaft is 400 mm or greater and 750 mm or less. Preferably, a shaft weight Ws is equal to or less than 65 g.

A preferable golf club includes a head, a shaft, and a grip. The shaft includes a bias layer and a straight layer. The bias layer includes a butt partial bias layer arranged at a butt end side of the shaft. The straight layer includes a tip partial straight layer arranged at a tip side of the shaft and a butt partial straight layer arranged at the butt end side of the shaft. A layer in which an elastic modulus of a reinforcing fiber is equal to or less than 20 ton/mm$^2$ is defined as a low-elastic layer. Preferably, the tip partial straight layer includes a tip low-elastic layer. Preferably, the butt partial straight layer includes a butt low-elastic layer. Preferably, a shaft length Ls of the club is equal to or less than 41 inches.

DESCRIPTION OF THE PREFERRED EMBODIMENTS

Hereinafter, the present invention will be described in detail based on the preferred embodiments with appropriate references to the accompanying drawings.

In the present application, an "axial direction" means an axial direction of a shaft. In the present application, a "radial direction" means a radial direction of the shaft.

Figure 1:
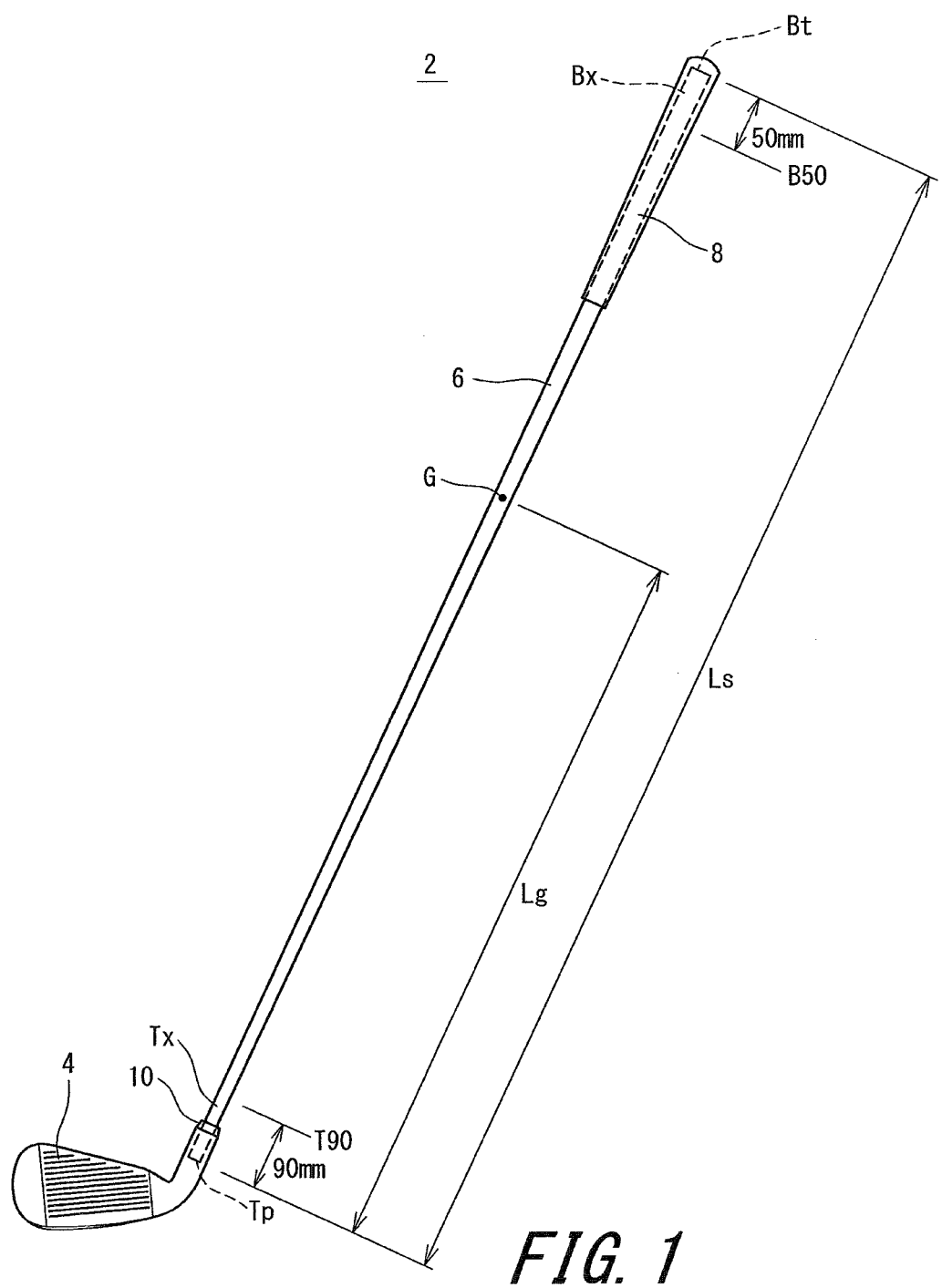
FIG. 1 shows a golf club including a shaft according to one embodiment.

FIG. 1 shows a golf club 2 according to one embodiment of the present invention. The golf club 2 includes a head 4, a shaft 6, and a grip 8. The head 4 is attached to a tip part of the shaft 6. The grip 8 is attached to a butt end part of the shaft 6. The head 4 is an iron type head. The golf club 2 is an iron type golf club. The shaft 6 is a shaft for irons.

The shaft 6 includes a plurality of fiber reinforced resin layers. The shaft 6 is a tubular body. The shaft 6 has a hollow structure. As shown in FIG. 1, the shaft 6 has a tip end Tp and a butt end Bt. The tip end Tp is positioned in the head 4. The butt end Bt is positioned in the grip 8.

The head 4 has a hosel hole. The tip part of the shaft 6 is inserted into the hosel hole. In the shaft 6, the axial direction length of a portion inserted into the hosel hole is usually 25 mm or greater and 70 mm or less.

A shaft length is shown by a double-pointed arrow Ls in FIG. 1. The shaft length Ls is an axial direction distance between the tip end Tp and the butt end Bt. An axial direction distance between the tip end Tp and a center of gravity G of the shaft is shown by a double-pointed arrow Lg in FIG. 1. The center of gravity G of the shaft is a center of gravity of the simple shaft 6. The center of gravity G is positioned on an axis line of the shaft.

The shaft 6 is a so-called carbon shaft. The shaft 6 is preferably produced by curing a prepreg sheet. In the prepreg sheet, fibers are oriented substantially in one direction. Thus, the prepreg in which the fibers are oriented substantially in one direction is also referred to as a UD prepreg. The term "UD" stands for uni-direction. Prepregs which are not the UD prepreg may be used. For example, fibers contained in the prepreg sheet may be woven.

The prepreg sheet includes a fiber and a resin. The resin is also referred to as a matrix resin. The fiber is typically a carbon fiber. The matrix resin is typically a thermosetting resin. As described later, in a part of prepregs, a glass fiber is used.

The shaft 6 is manufactured by a so-called sheetwinding method. In the prepreg, the matrix resin is in a semicured state. The shaft 6 is obtained by winding and curing the prepreg sheet.

In addition to an epoxy resin, a thermosetting resin other than the epoxy resin and a thermoplastic resin or the like may also be used as the matrix resin of the prepreg sheet. In respect of the strength of the shaft, the matrix resin is preferably the epoxy resin.

Figure 2:
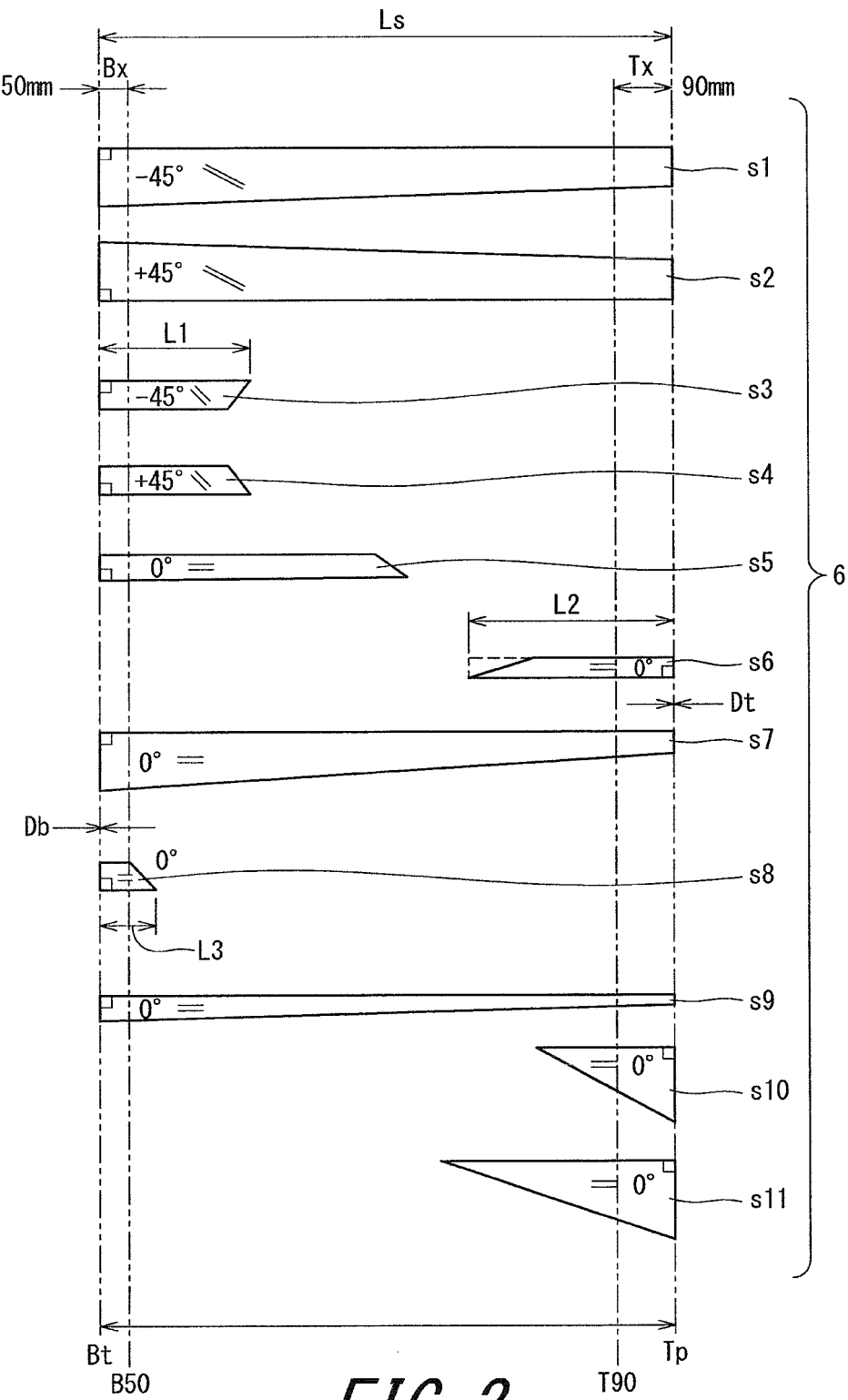
FIG. 2 is a developed view of the shaft of FIG. 1.

FIG. 2 is a developed view (sheet constitution view) of the prepreg sheets constituting the shaft 6. The shaft 6 includes a plurality of sheets. The shaft 6 includes eleven sheets of a first sheet s1 to an eleventh sheet s11. The developed view shown in FIG. 2 shows the sheets constituting the shaft in order from the radial inner side of the shaft. These sheets are wound in order from the sheet positioned on the uppermost side in the developed view. In FIG. 2, the horizontal direction of the figure coincides with the axial direction of the shaft. In FIG. 2, the right side of the figure is a tip end Tp side of the shaft. In FIG. 2, the left side of the figure is a butt end Bt side of the shaft.

The developed view shows not only the winding order of the sheets but also the disposal of each of the sheets in the axial direction of the shaft. For example, in FIG. 2, the ends of the sheets s6, s10, and s11 are positioned at the tip end Tp of the shaft. For example, in FIG. 2, the ends of the sheets s3, s4, s5, and s8 are positioned at the butt end Bt of the shaft.

The term "layer" and the term "sheet" are used in the present application. The "layer" is termed after being wound. Meanwhile, the "sheet" is termed before being wound. The "layer" is formed by winding the "sheet". That is, the wound "sheet" forms the "layer". In the present application, the same symbol is used in the layer and the sheet. For example, a layer formed by a sheet s1 is a layer s1.

The shaft 6 includes a straight layer and a bias layer. An orientation angle Af of the fiber is described for each of the sheets in the developed view of the present application. The orientation angle Af is an angle to the axial direction the shaft.

A sheet described as "0 degree" constitutes the straight layer. The sheet for the straight layer is also referred to as a straight sheet in the present application.

The straight layer is a layer in which the orientation of the fiber is substantially 0 degree to the axial direction of the shaft. The orientation of the fiber may not be completely set to 0 degree to the axial direction of the shaft due to an error or the like in winding. Usually, in the straight layer, the absolute angle θa is equal to or less than 10 degrees.

The absolute angle θa is the absolute value of the orientation angle Af. For example, "the absolute angle θa is equal to or less than 10 degrees" means that "the angle Af is −10 degrees or greater and +10 degrees or less".

In the embodiment of FIG. 2, the straight sheets are the sheet s5, the sheet s6, the sheet s7, the sheet s8, and the sheet s9, the sheet s10, and the sheet s11.

The bias layer is highly correlated with the torsional rigidity and torsional strength of the shaft. Preferably, a bias sheet includes a two-sheet pair in which orientation angles of fibers are inclined in opposite directions. In respect of the torsional rigidity, the absolute angle θa of the bias layer is preferably equal to or greater than 15 degrees, more preferably equal to or greater than 25 degrees, and still more preferably equal to or greater than 40 degrees. In respects of the torsional rigidity and flexural rigidity, the absolute angle θa of the bias layer is preferably equal to or less than 60 degrees, and more preferably equal to or less than 50 degrees.

In the shaft 6, the sheets constituting the bias layer are the sheets s1, s2, s3, and s4. As described above, in FIG. 2, the angle Af is described in each sheet. The plus (+) and minus (−) in the angle Af show that the fibers of the bias sheets are inclined in opposite directions. In the present application, the sheet for the bias layer is also merely referred to as a bias sheet. The sheets s1 and s2 constitute a first sheet pair. The sheets s3 and s4 constitute a second sheet pair. These sheet pairs constitute united sheets to be described later.

In FIG. 2, the inclination direction of the fiber of the sheet s2 is equal to the inclination direction of the fiber of the sheet s1. However, as described later, the sheet s2 is turned over, and stacked on the sheet s1. As a result, the inclination direction of the sheet s1 and the inclination direction of the sheet s2 are opposite to each other. Similarly, the sheet s4 is turned over, and stacked on the sheet s3.

The number of the layers to be formed from one sheet is not limited. For example, if the number of plies of a sheet is 1, the sheet is wound by one round in a circumferential direction. If the number of plies of the sheet is 1, the sheet forms one layer at all positions in the circumferential direction of the shaft.

For example, if the number of plies of a sheet is 2, the sheet is wound by two rounds in the circumferential direction. If the number of plies of the sheet is 2, the sheet forms two layers at the all positions in the circumferential direction of the shaft.

For example, if the number of plies of a sheet is 1.5, the sheet is wound by 1.5 rounds in the circumferential direction. If the number of plies of the sheet is 1.5, the sheet forms one layer at the circumferential position of 0 to 180 degrees, and forms two layers at the circumferential position of 180 degrees to 360 degrees.

In respect of suppressing winding fault such as wrinkles, a sheet having a too large width is not preferable. In this respect, the number of plies of one bias sheet is preferably equal to or less than 4, and more preferably equal to or less than 3. In respect of the working efficiency of the winding process, the number of plies of the bias sheet is equal to or greater than 1.

In respect of suppressing winding fault such as wrinkles, a sheet having a too large width is not preferable. In this respect, the number of plies of one straight sheet is preferably equal to or less than 4, more preferably equal to or less than 3, and still more preferably equal to or less than 2. In respect of the working efficiency of the winding process, the number of plies of the straight sheet is preferably equal to or greater than 1. The number of plies may be 1 in all the straight sheets.

In a full length sheet, winding fault is apt to be generated. In respect of suppressing the winding fault, the number of plies of one sheet in all full length straight sheets is preferably equal to or less than 2. The number of plies may be 1 in all the full length straight sheets.

In respect of suppressing winding fault such as wrinkles, a sheet having a too large width is not preferable. In this respect, the number of plies of the hoop sheet is preferably equal to or less than 4, more preferably equal to or less than 3, and still more preferably equal to or less than 2. In respect of the working efficiency of the winding process, the number of plies of one hoop sheet is preferably equal to or greater than 1. The number of plies may be equal to or less than 2 in all the hoop sheets.

In the full length sheet, winding fault is apt to be generated. In respect of suppressing the winding fault, the number of plies of one sheet in all full length hoop sheets is preferably equal to or less than 2. The number of plies may be 1 in all the full length hoop sheets.

Although not shown in the drawings, the prepreg sheet before being used is sandwiched between cover sheets. The cover sheets are usually a mold release paper and a resin film. That is, the prepreg sheet before being used is sandwiched between the mold release paper and the resin film. The mold release paper is applied on one surface of the prepreg sheet, and the resin film is applied on the other surface of the prepreg sheet. Hereinafter, the surface on which the mold release paper is applied is also referred to as "a surface of a mold release paper side", and the surface on which the resin film is applied is also referred to as "a surface of a film side".

In the developed view of the present application, the surface of the film side is the front side. That is, in FIG. 2, the front side of the figure is the surface of the film side, and the back side of the figure is the surface of the mold release paper side. In FIG. 2, the direction of a line showing the direction of the fiber of the sheet s1 is the same as the direction of a line showing the direction of the fiber of the sheet s2. However, in the case of the stacking to be described later, the sheet s2 is reversed. As a result, the directions of the fibers of the sheets s1 and s2 are opposite to each other. Therefore, the directions of the fibers of the sheets s1 and s2 are opposite to each other. In light of this point, in FIG. 2, the direction of the fiber of the sheet s1 is described as "−45 degrees", and the direction of the fiber of the sheet s2 is described as "+45 degrees".

In order to wind the prepreg sheet, the resin film is first peeled. The surface of the film side is exposed by peeling the resin film. The exposed surface has tacking property (tackiness). The tacking property is caused by the matrix resin. That is, since the matrix resin is in a semicured state, the tackiness is developed. The edge part of the exposed surface of the film side is also referred to as a winding start edge part. Next, the winding start edge part is applied to a wound object. The winding start edge part can be smoothly applied due to the tackiness of the matrix resin. The wound object is a mandrel or a wound article obtained by winding the other prepreg sheet around the mandrel. Next, the mold release paper is peeled. Next, the wound object is rotated to wind the prepreg sheet around the wound object. Thus, the resin film is previously peeled, and then, the winding start edge part is applied to the wound object, and the mold release paper is then peeled. That is, the resin film is previously peeled. After the winding start edge part is applied to the wound object, the mold release paper is peeled. The procedure suppresses wrinkles and winding fault of the sheet. This is because the sheet to which the mold release paper is applied is supported by the mold release paper, and is less likely to cause wrinkles. The mold release paper has flexural rigidity higher than the flexural rigidity of the resin film.

In the embodiment of FIG. 2, a united sheet is formed. The united sheet is formed by stacking two or more sheets.

In the embodiment of FIG. 2, four united sheets are formed. A first united sheet is formed by stacking the sheet s2 on the sheet s1. A second united sheet is formed by stacking the sheet s4 on the sheet s3. A third united sheet is formed by stacking the sheet s5 and the sheet s6 on the sheet s7. A fourth united sheet is formed by stacking the sheet s8 on the sheet s9. The sheets related to the united sheet are wound in a state of the united sheet.

In the third united sheet, the tip low-elastic sheet s6 is stacked on the full length straight sheet s7. Since the relative position of the sheet s6 to the sheet s7 is accurately set by the united sheet, the winding accuracy of the tip low-elastic sheet s6 can be improved.

In the fourth united sheet, the butt low-elastic sheet s8 is stacked on the full length straight sheet s9. Since the relative position of the sheet s8 to the sheet s9 is accurately set by the united sheet, the winding accuracy of the butt low-elastic sheet s8 can be improved.

As described above, in the present application, the sheet and the layer are classified by the orientation angle of the fiber. Furthermore, in the present application, the sheet and the layer are classified by the axial direction length of the shaft.

In the present application, a layer substantially wholly arranged in the axial direction of the shaft is referred to as a full length layer. In the present application, a sheet substantially wholly arranged in the axial direction of the shaft is referred to as a full length sheet. The wound full length sheet forms the full length layer.

A position separated by 20 mm in the axial direction from the tip end Tp is defined as Tp1, and a region between the tip end Tp and the point Tp1 is defined as a first region. A position separated by 20 mm in the axial direction from the butt end Bt is defined as Bt1, and a region between the butt end Bt and the point Bt1 is defined as a second region. The first region and the second region have a limited influence on the performance of the shaft. In this respect, the full length sheet may not exist in the first region and the second region. Preferably, the full length sheet extends from the tip end Tp to the butt end Bt. In other words, the full length sheet is preferably wholly arranged in the axial direction of the shaft.

In the present application, a layer partially arranged in the axial direction of the shaft is referred to as a partial layer. In the present application, a sheet partially arranged in the axial direction of the shaft is referred to as a partial sheet. The wound partial sheet forms the partial layer. Preferably, the axial direction length of the partial sheet is equal to or less than half the full length Ls of the shaft.

In the present application, the full length layer which is the straight layer is referred to as a full length straight layer. In the embodiment of FIG. 2, the full length straight layers are layers s7 and s9. The full length straight sheets are sheets s7 and s9.

In the present application, the partial layer which is the straight layer is referred to a partial straight layer. In the embodiment of FIG. 2, the partial straight layers are layers s5, s6, s8, s10, and s11. Partial straight sheets are the sheets s5, s6, s8, s10, and s11.

In the present application, the hoop layer is not provided. The hoop layer may be provided.

The term "butt partial layer" is used in the present application. Examples of the butt partial layer include a butt partial straight layer and a butt partial bias layer.

In the embodiment of FIG. 2, the butt partial straight layers are the layers s5 and s8. Butt partial straight sheets are the sheets s5 and s8.

In the embodiment of FIG. 2, the butt partial bias layers are the layers s3 and s4. Butt partial bias sheets are the sheets s3 and s4.

The butt partial layer can contribute to the adjustment of a ratio (Lg/Ls). The ratio (Lg/Ls) is also referred to as a ratio of a center of gravity of the shaft.

An axial direction distance between a butt end of the butt partial layer and the butt end Bt of the shaft is shown by a double-pointed arrow Db in FIG. 2. The axial direction distance Db is preferably equal to or less than 20 mm, more preferably equal to or less than 10 mm, and still more preferably 0 mm. In the embodiment, the axial direction distance Db is 0 mm.

In the present application, the term "tip partial layer" is used. The shaft 6 includes a tip partial straight layer as the tip partial layer. In FIG. 2, the tip partial straight layers are the layers s6, s10, and s11. Tip partial straight sheets are the sheets s6, s10, and s11. The tip partial layer can enhance the strength of a tip portion of the shaft 6. The tip partial layer can contribute to the adjustment of the ratio (Lg/Ls).

An axial direction distance between a tip of the tip partial layer and the tip end Tp of the shaft is shown by a double-pointed arrow Dt in FIG. 2. The axial direction distance Dt is preferably equal to or less than 20 mm, more preferably equal to or less than 10 mm, and still more preferably equal to or less than 0 mm. In the embodiment, the axial direction distance Dt is 0 mm.

The shaft 6 is produced by the sheet winding method using the sheets shown in FIG. 2.

Hereinafter, a manufacturing process of the shaft 6 will be schematically described.

[Outline of Manufacturing Process of Shaft]

(1) Cutting Process

The prepreg sheet is cut into a desired shape in the cutting process. Each of the sheets shown in FIG. 2 is cut out by the process.

The cutting may be performed by a cutting machine, or may be manually performed. In the manual case, for example, a cutter knife is used.

(2) Stacking Process

In the stacking process, the four united sheets described above are produced.

In the stacking process, heating or a press may be used. More preferably, the heating and the press are used in combination. In a winding process to be described later, the deviation between the sheets may be generated during the winding operation of the united sheet. The deviation reduces winding accuracy. The heating and the press improve an adhesive force between the sheets. The heating and the press suppress the deviation between the sheets in the winding process.

(3) Winding Process

A mandrel is prepared in the winding process. A typical mandrel is made of a metal. A mold release agent is applied to the mandrel. Furthermore, a resin having tackiness is applied to the mandrel. The resin is also referred to as a tacking resin. The cut sheet is wound around the mandrel. The tacking resin facilitates the application of the end part of the sheet to the mandrel.

The sheets are wound in order from the sheet positioned on the uppermost side in the developed view of FIG. 2. The sheets to be stacked are wound in a state of the united sheet.

A winding body is obtained in the winding process. The winding body is obtained by winding the prepreg sheet around the outside of the mandrel. For example, the winding is achieved by rolling the wound object on a plane. The winding may be performed by a manual operation or a machine. The machine is referred to as a rolling machine.

(4) Tape Wrapping Process

A tape is wrapped around the outer peripheral surface of the winding body in the tape wrapping process. The tape is also referred to as a wrapping tape. The tape is wrapped while tension is applied to the tape. A pressure is applied to the winding body by the wrapping tape. The pressure reduces voids.

(5) Curing Process

In the curing process, the winding body after performing the tape wrapping is heated. The heating cures the matrix resin. In the curing process, the matrix resin fluidizes temporarily. The fluidization of the matrix resin can discharge air between the sheets or in the sheet. The pressure (fastening force) of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The order of the both processes is not limited. However, the process of removing the wrapping tape is preferably performed after the process of extracting the mandrel in respect of improving the efficiency of the process of removing the wrapping tape.

(7) Process of Cutting Both Ends

Both the end parts of the cured laminate are cut in the process. The cutting flattens the end face of the tip end Tp and the end face of the butt end Bt.

In order to facilitate the understanding, in all the developed views of the present application, the sheets after both the ends are cut are shown. In fact, the cutting of both the ends is considered in the setting of the size of each of the sheets. That is, in fact, both end portions to be cut are respectively added to both the end parts of each of the sheets.

(8) Polishing Process

The surface of the cured laminate is polished in the process. Spiral unevenness left behind as the trace of the wrapping tape exists on the surface of the cured laminate. The polishing extinguishes the unevenness as the trace of the wrapping tape to smooth the surface of the cured laminate. Preferably, whole polishing and tip partial polishing are conducted in the polishing process.

(9) Coating Process

The cured laminate after the polishing process is subjected to coating.

The shaft 6 is obtained in the processes. The shaft 6 is lightweight and superior in strength.

As described above, the shaft 6 includes the full length bias layers s1 and s2 and the butt partial bias layers s3 and s4 arranged at the butt end side of the shaft, as the bias layer. The shaft 6 includes the full length straight layers s7 and s9 and the tip partial straight layers s6, s10, and s11 as the straight layer. The shaft 6 includes the butt partial straight layers s5 and s8.

[Low-Elastic Layer]

In the present application, a low-elastic layer is defined. The low-elastic layer is a layer in which the elastic modulus of a reinforcing fiber is equal to or less than 20 ton/mm$^2$. In respect of achieving an effect to be described later, the elastic modulus of the reinforcing fiber in the low-elastic layer is preferably equal to or less than 15 ton/mm², and more preferably equal to or less than 10 ton/mm². In respect of the strength, the elastic modulus of the reinforcing fiber of the low-elastic layer is preferably equal to or greater than 4 ton/mm².

The reinforcing fiber in the low-elastic layer is not limited. Examples of the reinforcing fiber include a carbon fiber and a glass fiber. Examples of the carbon fiber include a PAN based carbon fiber and a pitch based carbon fiber. In respect of being likely to obtain low elasticity, the reinforcing fiber is preferably the pitch based carbon fiber and the glass fiber. From a reason to be described later, the glass fiber is more preferable.

In the shaft 6, the tip partial straight layer s6 is a tip low-elastic layer. Meanwhile, the tip partial straight layers s10 and s11 are not the low-elastic layers. The tip partial straight layers s10 and s11 are middle-elastic layers. The middle-elastic layer is a layer in which the elastic modulus of a reinforcing fiber is greater than 20 ton/mm² and equal to or less than 40 ton/mm². Thus, the tip partial straight layer includes the low-elastic layer and the middle-elastic layer.

In the shaft 6, the butt partial straight layer s8 is a butt low-elastic layer. Meanwhile, the butt partial straight layer s5 is not the low-elastic layer. The butt partial straight layer s5 is the middle-elastic layer. Thus, the butt partial straight layer includes the low-elastic layer and the middle-elastic layer.

Impact is caused on the head 4 by hitting. The tip low-elastic layer s6 is close to the head 4. Since the fiber has low elasticity, the tip low-elastic layer s6 can effectively absorb the impact caused by hitting. Therefore, a ball hitting feeling can be improved. The tip low-elastic layer s6 increases the flexure of the tip part. Flexure return is caused as the back action of the flexure. A face is likely to be turned in impact by the flexure return. Therefore, the opening of the face in impact can be suppressed. A flight distance can be improved by suppressing the opening of the face. Hereinafter, these effects caused by the tip low-elastic layer s6 are also referred to as a tip effect A.

The butt low-elastic layer s8 is positioned at inner side of the grip 8. The butt low-elastic layer s8 is close to hands of a human body gripping the grip 8. The butt low-elastic layer s8 can effectively absorb the impact felt by the hands. Therefore, the ball hitting feeling can be improved. The flexural rigidity of the butt end part of the shaft 6 is suppressed by the butt low-elastic layer s8. The butt low-elastic layer s8 can increase the flexure of the butt end part of the shaft 6. The flexure in the butt end part largely displaces the tip part of the shaft 6. In other words, the flexure in the butt end part largely displaces the head 4. The flexure in the butt end part has a large effect on a head speed. The flexure causes the flexure return. The flexure return in the butt end part can improve the head speed. Hereinafter, these effects caused by the butt low-elastic layer s8 are also referred to as a butt effect B.

In the embodiment, the reinforcing fiber of the tip low-elastic layer s6 is the glass fiber. In other words, the tip low-elastic layer s6 is a glass fiber reinforced layer.

In the embodiment, the reinforcing fiber of the butt low-elastic layer s8 is the glass fiber. In other words, the butt low-elastic layer s8 is the glass fiber reinforced layer.

The elastic modulus of the typical glass fiber is about 7 to 8 ton/mm². The elastic modulus of the glass fiber is comparatively low. An impact-absorbing energy is improved by disposing the glass fiber reinforced layer. The impact caused by hitting a ball is effectively absorbed by the glass fiber reinforced layer s6 of the tip part. The glass fiber reinforced layer s6 enhances the strength of the shaft. The glass fiber reinforced layer s6 can enhance the tip effect A described above.

The glass fiber reinforced layer s8 of the butt end part is close to golf player's hands. The layer s8 has excellent impact-absorbing performance due to the glass fiber. Therefore, the layer s8 of the butt end part can contribute to an improvement in the ball hitting feeling. Furthermore, as described above, the glass fiber reinforced layer s8 of the butt end part can contribute to an improvement in the head speed. The glass fiber reinforced layer s8 can enhance the butt effect B described above.

In the present application, the total weight of the glass fiber reinforced layers is defined as Wg. In the embodiment, Wg is the total of the weight of the tip low-elastic layer s6 and the weight of the butt low-elastic layer s8.

In the present application, a shaft weight is defined as Ws. Ws is the weight of the entire shaft. In the embodiment, the total weight of the layers s1 to s11 is Ws.

In the embodiment, Wg/Ws is less than 0.10. The specific gravity of the glass fiber is greater than the specific gravity of the carbon fiber. The weight saving of the shaft can be achieved by setting Wg/Ws to be less than 0.10. In this respect, Wg/Ws is preferably equal to or less than 0.08, more preferably equal to or less than 0.06, and still more preferably equal to or less than 0.05. In respect of enhancing the effect described above due to the glass fiber, Wg/Ws is preferably equal to or greater than 0.02.

In the embodiment, the glass fiber reinforced layer is provided in the tip part and the butt end part. Meanwhile, the full length layer does not include the glass fiber reinforced layer. Therefore, Wg/Ws is suppressed.

A position separated by 90 mm in the axial direction from the tip end Tp is shown by symbol T90 in FIGS. 1 and 2. In the present application, a region between the tip end Tp and the position T90 is also referred to as a specific tip end part Tx.

A position separated by 50 mm in the axial direction from the butt end Bt is shown by symbol B50 in FIGS. 1 and 2. In the present application, a region between the butt end Bt and the position B50 is also referred to as a specific butt end part Bx.

In the present application, the weight of the specific tip end part Tx is defined as Wt. The weight of the specific butt end part Bx is defined as Wb. The weight of the tip low-elastic layer in the specific tip end part Tx is defined as Wt1. In the embodiment, Wt1 is a part of the weight of the tip low-elastic layer s6. The weight of the butt low-elastic layer in the specific butt end part Bx is defined as Wb1. In the embodiment, Wb1 is a part of the weight of the butt low-elastic layer s8.

In the embodiment, the tip low-elastic layer s6 and the butt low-elastic layer s8 are the glass fiber reinforced layers. Furthermore, Wb1/Wb is greater than Wt1/Wt. As described above, the specific gravity of the glass fiber is large. Wb1/Wb is set to be greater than Wt1/Wt, and thereby the center of gravity G of the shaft is likely to approach the butt end Bt. In other words, the distance Lg described above is likely to be increased. Therefore, the ratio (Lg/Ls) of the center of gravity of the shaft can be increased. The improvement in the ratio of the center of gravity of the shaft can cause a light swing balance and improve the head speed.

In respects of the impact-absorbing energy described above and of enhancing the tip effect A, Wt1/Wt is preferably equal to or greater than 0.05, more preferably equal to or greater than 0.07, still more preferably equal to or greater than 0.09, and yet still more preferably equal to or greater than 0.11. As described above, the specific gravity of the glass fiber is high. In respect of increasing the ratio of the center of gravity of the shaft, Wt1/Wt is preferably equal to or less than 0.20, more preferably equal to or less than 0.18, and still more preferably equal to or less than 0.16.

In respect of enhancing the butt effect B and the ball hitting feeling, Wb1/Wb is preferably equal to or greater than 0.07, more preferably equal to or greater than 0.09, still more preferably equal to or greater than 0.11, and yet still more preferably equal to or greater than 0.13. Also in respect of increasing the ratio of the center of gravity of the shaft, Wb1/Wb is preferably large. When Wb1/Wb is excessively large, the flexure return may not be sufficiently caused. In this respect, Wb1/Wb is preferably equal to or less than 0.25, more preferably equal to or less than 0.23, and still more preferably equal to or less than 0.21.

As described above, the shaft 6 includes the butt partial bias layers s3 and s4. Torsional rigidity is improved by the butt partial bias layer. Therefore, the directional stability of the hit ball is enhanced. The ratio of the center of gravity of the shaft can be increased by the butt partial bias layers s3 and s4.

The weight of the butt partial bias layer is defined as Wx. In the shaft 6, the total weight of the layers s3 and s4 is Wx. In respects of the directional stability of the hit ball and the ratio of the center of gravity of the shaft, Wx/Ws is preferably equal to or greater than 0.05, more preferably equal to or greater than 0.07, still more preferably equal to or greater than 0.09, and yet still more preferably equal to or greater than 0.11. In respect of the weight saving of the shaft, Wx/Ws is preferably equal to or less than 0.20, more preferably equal to or less than 0.18, and still more preferably equal to or less than 0.16.

An axial direction length of the butt partial bias layer is shown by a double-pointed arrow L1 in FIG. 2. In respect of enhancing the directional stability of the hit ball, the length L1 is preferably equal to or greater than 50 mm, more preferably equal to or greater than 100 mm, and still more preferably equal to or greater than 150 mm. In respect of the weight saving of the shaft, the length L1 is preferably equal to or less than 400 mm, more preferably equal to or less than 350 mm, still more preferably equal to or less than 300 mm, and yet still more preferably equal to or less than 250 mm.

An axial direction length of the tip low-elastic layer is shown by a double-pointed arrow L2 in FIG. 2. In respect of enhancing the tip effect A described above, the length L2 is preferably equal to or greater than 50 mm, more preferably equal to or greater than 100 mm, and still more preferably equal to or greater than 150 mm. In respect of the weight saving of the shaft, the length L2 is preferably equal to or less than 400 mm, more preferably equal to or less than 350 mm, and still more preferably equal to or less than 300 mm.

An axial direction length of the butt low-elastic layer is shown by a double-pointed arrow L3 in FIG. 2. In respect of enhancing the butt effect B described above, the length L3 is preferably equal to or greater than 30 mm, more preferably equal to or greater than 50 mm, still more preferably equal to or greater than 80 mm, and yet still more preferably equal to or greater than 100 mm. In respect of the weight saving of the shaft, the length L3 is preferably equal to or less than 300 mm, more preferably equal to or less than 250 mm, and still more preferably equal to or less than 200 mm.

As described above, the axial direction distance Lg between the tip end Tp and the center of gravity G of the shaft is shown in FIG. 1. In respect of increasing the ratio of the center of gravity of the shaft, the distance Lg is preferably equal to or greater than 400 mm, more preferably equal to or greater than 420 mm, still more preferably equal to or greater than 440 mm, and yet still more preferably equal to or greater than 460 mm. In light of the strength of the tip part of the shaft, the distance Lg is preferably equal to or less than 750 mm, more preferably equal to or less than 730 mm, still more preferably equal to or less than 710 mm, yet still more preferably equal to or less than 690 mm, yet still more preferably equal to or less than 670 mm, and yet still more preferably equal to or less than 650 mm.

In respect of enhancing the head speed, the shaft weight Ws is preferably equal to or less than 65 g, more preferably equal to or less than 63 g, still more preferably equal to or less than 61 g, and yet still more preferably equal to or less than 59 g. In light of the strength of the shaft, the shaft weight Ws is preferably equal to or greater than 36 g, more preferably equal to or greater than 38 g, and still more preferably equal to or greater than 40 g.

As described above, the shaft 6 has excellent directional stability of the hit ball. The directional stability of the hit ball tends to be considered to be important in a comparatively short club. In this respect, the shaft length Ls is preferably equal to or less than 41 inches, more preferably equal to or less than 40 inches, and still more preferably equal to or less than 39 inches. Except for a putter, the shaft length Ls is usually equal to or greater than 33 inches. A shaft having good directional stability of the hit ball is particularly preferably used for the iron type golf club. The shaft 6 is preferably a shaft for irons.

In respects of the easiness of swing and the head speed, the ratio (Lg/Ls) is preferably equal to or greater than 0.37, more preferably equal to or greater than 0.40, still more preferably equal to or greater than 0.43, yet still more preferably equal to or greater than 0.46, and yet still more preferably equal to or greater than 0.49. In respect of the strength of the tip part, the ratio (Lg/Ls) is preferably equal to or less than 0.81.

Examples of means for adjusting the ratio of the center of gravity of the shaft include the following items (a1) to (a12):

(a1) increase or decrease of the number of windings of the butt partial layer;

(a2) increase or decrease of a thickness of the butt partial layer;

(a3) increase or decrease of an axial direction length of the butt partial layer;

(a4) increase or decrease of a resin content rate of the butt partial layer;

(a5) increase or decrease of a specific gravity of the butt partial layer;

(a6) increase or decrease of the number of windings of the tip partial layer;

(a7) increase or decrease of a thickness of the tip partial layer;

(a8) increase or decrease of an axial direction length of the tip partial layer;

(a9) increase or decrease of a resin content rate of the tip partial layer;

(a10) increase or decrease of a specific gravity of the tip partial layer;

(a11) increase or decrease of a specific gravity of the butt partial layer; and (a12) increase or decrease of a taper ratio of the shaft.

The following Table 1 shows examples of prepregs capable of being used. These prepregs are commercially available. Shafts having desired specifications can be produced by selecting the prepregs.

TABLE 1

Examples of prepregs capable of being used

| Manufacturer | Trade name | Thickness of sheet (mm) | Fiber content rate (% by mass) | Resin content rate (% by mass) | Part number of fiber | Physical property value of reinforcing fiber | |
|---|---|---|---|---|---|---|---|
| | | | | | | Tensile elastic modulus (t/mm$^2$) | Tensile strength (kgf/mm$^2$) |
| Toray Industries, Inc. | 3255S-10 | 0.082 | 76 | 24 | T700S | 24 | 500 |
| Toray Industries, Inc. | 3255S-12 | 0.103 | 76 | 24 | T700S | 24 | 500 |
| Toray Industries, Inc. | 3255S-15 | 0.123 | 76 | 24 | T700S | 24 | 500 |
| Toray Industries, Inc. | 805S-3 | 0.034 | 60 | 40 | M30S | 30 | 560 |
| Toray Industries, Inc. | 2255S-10 | 0.082 | 76 | 24 | T800S | 30 | 600 |
| Toray Industries, Inc. | 2255S-12 | 0.102 | 76 | 24 | T800S | 30 | 600 |
| Toray Industries, Inc. | 2255S-15 | 0.123 | 76 | 24 | T800S | 30 | 600 |
| Toray Industries, Inc. | 2256S-10 | 0.077 | 80 | 20 | T800S | 30 | 600 |
| Toray Industries, Inc. | 2256S-12 | 0.103 | 80 | 20 | T800S | 30 | 600 |
| Toray Industries, Inc. | 2276S-10 | 0.077 | 80 | 20 | T800S | 30 | 600 |
| Toho Tenax Co., Ltd. | Q-U11H-1080 | 0.082 | 75 | 25 | UT500 | 24.5 | 480 |
| Nippon Graphite Fiber Corporation | E1026A-09N | 0.100 | 63 | 37 | XN-10 | 10 | 190 |
| Nippon Graphite Fiber Corporation | E1026A-14N | 0.150 | 63 | 37 | XN-10 | 10 | 190 |
| Mitsubishi Rayon Co., Ltd. | GE352H-160S | 0.150 | 65 | 35 | E Glass | 7 | 320 |
| Mitsubishi Rayon Co., Ltd. | TR350C-100S | 0.083 | 75 | 25 | TR50S | 24 | 500 |
| Mitsubishi Rayon Co., Ltd. | TR350U-100S | 0.078 | 75 | 25 | TR50S | 24 | 500 |
| Mitsubishi Rayon Co., Ltd. | TR350C-125S | 0.104 | 75 | 25 | TR50S | 24 | 500 |
| Mitsubishi Rayon Co., Ltd. | TR350C-150S | 0.124 | 75 | 25 | TR50S | 24 | 500 |
| Mitsubishi Rayon Co., Ltd. | MR350C-075S | 0.063 | 75 | 25 | MR40 | 30 | 450 |
| Mitsubishi Rayon Co., Ltd. | MRX350C-100S | 0.085 | 75 | 25 | MR40 | 30 | 450 |
| Mitsubishi Rayon Co., Ltd. | MR350C-100S | 0.085 | 75 | 25 | MR40 | 30 | 450 |
| Mitsubishi Rayon Co., Ltd. | MRX350C-125S | 0.105 | 75 | 25 | MR40 | 30 | 450 |
| Mitsubishi Rayon Co., Ltd. | MR350C-125S | 0.105 | 75 | 25 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | HRX350C-075S | 0.057 | 75 | 25 | HR40 | 40 | 450 |
| Mitsubishi Rayon Co., Ltd. | HRX350C-110S | 0.082 | 75 | 25 | HR40 | 40 | 450 |

The tensile strength and the elastic modulus are measured based on "Testing Methods for Carbon Fibers" specified on JIS R7601: 1986.

EXAMPLES

Hereinafter, the effects of the present invention will be clarified by examples. However, the present invention should not be interpreted in a limited way based on the description of examples.

Example 1

A shaft was produced according to a laminated constitution shown in FIG. 2. A manufacturing method was as described above. Used prepregs were as follows.
 sheets s1, s2: TR350C-125S
 sheets s3, s4: Q-U11H-1080
 sheet s5: 2255S-10
 sheet s6: GE352H-160S
 sheet s7: 3255S-12
 sheet s8: GE352H-160S
 sheet s9: TR350C-125S
 sheet s10: 3255S-10
 sheet s11: TR350C-125S "Q-U11H-1080" was used as butt partial bias layers s3 and s4. A length L1 (see FIG. 2) was set to 200 mm.

In order to form a glass fiber reinforced layer, trade name "GE352H-160S" was used for the sheets s6 and s8. The sheet GE352H-160S is a glass fiber reinforced prepreg. A glass fiber is E glass, and the tensile elastic modulus of the glass fiber is 75 GPa (7.65 ton/mm$^2$). A length L2 (see FIG. 2) was set to 250 mm. A length L3 (see FIG. 2) was set to 100 mm.

A head and a grip were attached to the obtained shaft to obtain a club of example 1. A head for a 6-iron of trade name "XXIO 7 iron" manufactured by Dunlop Sports Co., Ltd. was used as the head of the club. The specifications and evaluation results of example 1 are shown in the following Table 2.

Examples 2 to 14 and Comparative Examples 1 to 6

Clubs of examples 2 to 14 and comparative examples 1 to 6 were obtained in the same manner as in example 1 except for specifications described in the following Tables 2 to 7.

Laminated constitutions of examples 1 to 14 were as shown in FIG. 2.

In comparative example 1, the sheets s3, s4, s6, and s8 among the sheets s1 to s11 shown in FIG. 2 were not used.

In comparative example 2, the sheets s3, s4, and s6 among the sheets s1 to s11 shown in FIG. 2 were not used.

In comparative example 3, the sheets s3, s4, and s8 among the sheets s1 to s11 shown in FIG. 2 were not used.

In comparative example 4, the sheets s3 and s4 among the sheets s1 to s11 shown in FIG. 2 were not used.

In comparative example 5, the sheets s6 and s8 among the sheets s1 to s11 shown in FIG. 2 were not used.

A laminated constitution of comparative example 6 was as shown in FIG. 2. However, in comparative example 6, middle-elastic sheets were used for the sheets s6 and s8. Therefore, comparative example 6 did not have a tip low-elastic layer and a butt low-elastic layer. In the middle-elastic sheets s6 and s8, the elastic modulus of a reinforcing fiber was 24 ton/mm. The axial direction length of the tip middle-elastic sheet s6 was 250 mm. The axial direction length of the butt middle-elastic sheet s8 was 100 mm. If the weight of the middle-elastic sheet s6 in a specific tip end part Tx was defined as W6, W6/Wt was 0.11. If the weight of the middle-elastic sheet s8 in a specific butt end part Bx was defined as W8, W8/Wb was 0.13.

The specifications and evaluation results of these examples are shown in the following Tables 2 to 5. The specifications and evaluation results of these comparative examples are shown in the following Tables 6 and 7. In order to adjust the specifications, the means (a1) to (a12) described above were appropriately selected. Prepregs described in Table 1 were appropriately selected.

TABLE 2

Specifications and evaluation results of examples

| | Unit | Example 1 | Example 2 | Example 3 | Example 4 |
|---|---|---|---|---|---|
| Shaft length Ls | mm | 930 | 930 | 930 | 930 |
| Shaft weight Ws | g | 40 | 50 | 65 | 70 |
| Distance Lg | mm | 460 | 460 | 460 | 460 |
| Lg/Ls | — | 0.49 | 0.49 | 0.49 | 0.49 |
| Presence or absence of butt partial bias layer | — | Presence | Presence | Presence | Presence |
| Length L1 of butt partial bias layer | mm | 200 | 200 | 200 | 200 |
| Wx/Ws | — | 0.14 | 0.14 | 0.14 | 0.14 |
| Presence or absence of butt low-elastic layer | — | Presence | Presence | Presence | Presence |
| Length L3 of butt low-elastic layer | mm | 100 | 100 | 100 | 100 |
| Wb1/Wb | — | 0.13 | 0.13 | 0.13 | 0.13 |
| Presence or absence of tip low-elastic layer | — | Presence | Presence | Presence | Presence |
| Length L2 of tip low-elastic layer | mm | 250 | 250 | 250 | 250 |
| Wt1/Wt | — | 0.11 | 0.11 | 0.11 | 0.11 |
| Wg/Ws | — | 0.08 | 0.06 | 0.05 | 0.04 |
| Three-point flexural strength at point T | kgf | 151 | 286 | 343 | 397 |
| Three-point flexural strength at point C | kgf | 163 | 174 | 190 | 211 |
| Flight distance | yards | 172 | 163 | 151 | 140 |
| Lateral deviation | yards | 10 | 8 | 8 | 6 |
| Feeling | — | 4 | 4 | 4 | 3 |

TABLE 3

Specifications and evaluation results of examples

| | Unit | Example 5 | Example 6 | Example 7 | Example 8 |
|---|---|---|---|---|---|
| Shaft length Ls | mm | 930 | 930 | 930 | 930 |
| Shaft weight Ws | g | 60 | 60 | 60 | 60 |
| Distance Lg | mm | 400 | 480 | 650 | 750 |
| Lg/Ls | — | 0.43 | 0.52 | 0.70 | 0.81 |
| Presence or absence of butt partial bias layer | — | Presence | Presence | Presence | Presence |
| Length L1 of butt partial bias layer | mm | 200 | 200 | 200 | 200 |
| Wx/Ws | — | 0.14 | 0.14 | 0.14 | 0.14 |
| Presence or absence of butt low-elastic layer | — | Presence | Presence | Presence | Presence |
| Length L3 of butt low-elastic layer | mm | 100 | 100 | 100 | 100 |
| Wb1/Wb | — | 0.13 | 0.13 | 0.13 | 0.13 |
| Presence or absence of tip low-elastic layer | — | Presence | Presence | Presence | Presence |
| Length L2 of tip low-elastic layer | mm | 250 | 250 | 250 | 250 |
| Wt1/Wt | — | 0.11 | 0.11 | 0.11 | 0.11 |
| Wg/Ws | — | 0.05 | 0.05 | 0.05 | 0.05 |
| Three-point flexural strength at point T | kgf | 381 | 372 | 348 | 339 |
| Three-point flexural strength at point C | kgf | 176 | 181 | 188 | 201 |
| Flight distance | yards | 136 | 152 | 160 | 172 |
| Lateral deviation | yards | 6 | 10 | 11 | 14 |
| Feeling | — | 3 | 4 | 4 | 4 |

TABLE 4

Specifications and evaluation results of examples

| | Unit | Example 9 | Example 10 | Example 11 | Example 12 |
|---|---|---|---|---|---|
| Shaft length Ls | mm | 930 | 930 | 930 | 930 |
| Shaft weight Ws | g | 58 | 63 | 59 | 70 |
| Distance Lg | mm | 470 | 480 | 460 | 340 |
| Lg/Ls | — | 0.51 | 0.52 | 0.49 | 0.37 |
| Presence or absence of butt partial bias layer | — | Presence | Presence | Presence | Presence |
| Length L1 of butt partial bias layer | mm | 100 | 350 | 200 | 200 |
| Wx/Ws | — | 0.14 | 0.14 | 0.07 | 0.14 |
| Presence or absence of butt low-elastic layer | — | Presence | Presence | Presence | Presence |
| Length L3 of butt low-elastic layer | mm | 100 | 100 | 80 | 170 |
| Wb1/Wb | — | 0.13 | 0.13 | 0.13 | 0.13 |
| Presence or absence of tip low-elastic layer | — | Presence | Presence | Presence | Presence |
| Length L2 of tip low-elastic layer | mm | 250 | 250 | 250 | 250 |
| Wt1/Wt | — | 0.11 | 0.11 | 0.11 | 0.11 |
| Wg/Ws | — | 0.05 | 0.05 | 0.04 | 0.12 |
| Three-point flexural strength at point T | kgf | 341 | 339 | 338 | 341 |
| Three-point flexural strength at point C | kgf | 188 | 196 | 187 | 198 |
| Flight distance | yards | 137 | 143 | 146 | 144 |
| Lateral deviation | yards | 15 | 7 | 8 | 7 |
| Feeling | — | 4 | 4 | 4 | 3 |

TABLE 5

Specifications and evaluation results of examples

| | Unit | Example 13 | Example 14 |
|---|---|---|---|
| Shaft length Ls | mm | 930 | 930 |
| Shaft weight Ws | g | 59 | 61 |
| Distance Lg | mm | 440 | 460 |
| Lg/Ls | — | 0.47 | 0.49 |
| Presence or absence of butt partial bias layer | — | Presence | Presence |
| Length L1 of butt partial bias layer | mm | 200 | 200 |
| Wx/Ws | — | 0.14 | 0.14 |
| Presence or absence of butt low-elastic layer | — | Presence | Presence |
| Length L3 of butt low-elastic layer | mm | 100 | 100 |
| Wb1/Wb | — | 0.13 | 0.13 |
| Presence or absence of tip low-elastic layer | — | Presence | Presence |
| Length L2 of tip low-elastic layer | mm | 100 | 400 |
| Wt1/Wt | — | 0.11 | 0.11 |
| Wg/Ws | — | 0.02 | 0.09 |
| Three-point flexural strength at point T | kgf | 348 | 321 |
| Three-point flexural strength at point C | kgf | 191 | 189 |
| Flight distance | yards | 147 | 132 |
| Lateral deviation | yards | 8 | 9 |
| Feeling | — | 3 | 4 |

TABLE 6

Specifications and evaluation results of comparative examples

| | Unit | Comparative example 1 | Comparative example 2 | Comparative example 3 | Comparative example 4 |
|---|---|---|---|---|---|
| Shaft length Ls | mm | 930 | 930 | 930 | 930 |
| Shaft weight Ws | g | 52 | 55 | 53 | 56 |
| Distance Lg | mm | 510 | 470 | 520 | 480 |
| Lg/Ls | — | 0.55 | 0.51 | 0.56 | 0.52 |
| Presence or absence of butt partial bias layer | — | Absence | Absence | Absence | Absence |
| Length L1 of butt partial bias layer | mm | — | — | — | — |
| Wx/Ws | — | — | — | — | — |
| Presence or absence of butt low-elastic layer | — | Absence | Presence | Absence | Presence |
| Length L3 of butt low-elastic layer | mm | — | 100 | — | 100 |
| Wb1/Wb | — | — | 0.13 | — | 0.13 |
| Presence or absence of tip low-elastic layer | — | Absence | Absence | Presence | Presence |
| Length L2 of tip low-elastic layer | mm | — | — | 250 | 250 |
| Wt1/Wt | — | — | — | 0.11 | 0.05 |
| Wg/Ws | — | — | — | 0.04 | 0.05 |
| Three-point flexural strength at point T | kgf | 362 | 363 | 339 | 340 |
| Three-point flexural strength at point C | kgf | 128 | 141 | 145 | 132 |
| Flight distance | yards | 146 | 139 | 133 | 134 |
| Lateral deviation | yards | 20 | 18 | 21 | 17 |
| Feeling | — | 1 | 2 | 2 | 3 |

TABLE 7

Specifications and evaluation results of comparative examples

| | Unit | Comparative example 5 | Comparative example 6 |
|---|---|---|---|
| Shaft length Ls | mm | 930 | 930 |
| Shaft weight Ws | g | 55 | 55 |
| Distance Lg | mm | 470 | 420 |
| Lg/Ls | — | 0.51 | 0.45 |
| Presence or absence of butt partial bias layer | — | Presence | Presence |
| Length L1 of butt partial bias layer | mm | 200 | 200 |
| Wx/Ws | — | 0.14 | 0.14 |
| Presence or absence of butt low-elastic layer | — | Absence | Absence |
| Length L3 of butt low-elastic layer | mm | — | — |
| Wb1/Wb | — | — | — |
| Presence or absence of tip low-elastic layer | — | Absence | Absence |
| Length L2 of tip low-elastic layer | mm | — | — |
| Wt1/Wt | — | — | — |
| Wg/Ws | — | — | — |
| Three-point flexural strength at point T | kgf | 358 | 383 |
| Three-point flexural strength at point C | kgf | 145 | 205 |
| Flight distance | yards | 129 | 123 |
| Lateral deviation | yards | 12 | 10 |
| Feeling | — | 1 | 1 |

[Evaluation Methods]
[Three-Point Flexural Strength]

Figure 3:
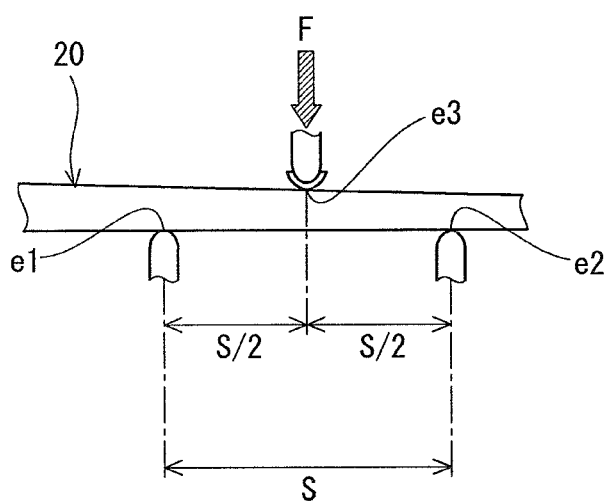
FIG. 3 is a schematic view showing a method for measuring a three-point flexural strength.

The three-point flexural strength was measured based on an SG type three-point flexural strength test. This is a test set by Consumer Product Safety Association in Japan. FIG. 3 shows a measuring method of the three-point flexural strength test. Measured points were a point T and a point C. The point T is a point separated by 90 mm from the tip end Tp of the shaft. The point T is the position T90 described above. The point C is a point separated by 175 mm from the butt end Bt of the shaft.

As shown in FIG. 3, a load F is applied downward from above at a load point e3 while a shaft 20 is supported from below at two supporting points e1 and e2. The load point e3 is positioned at a position bisecting the distance between the supporting points e1 and e2. The load point e3 is the measured point. A span S is the distance between the supporting point e1 and the supporting point e2. If the point T was measured, the span S was set to 150 mm. If the point C was measured, the span S was set to 300 mm. A value (peak value) of the load F with the shaft 20 was broken was measured. The values are shown in Tables 2 to 7.

[Flight Distance]

Ten golf players having a handicap of 10 or greater and 20 or less actually hit golf balls to conduct tests. Each of the golf players hit five balls with each of the clubs. The flight distances (yards) of all shots were measured. The average values of all data are shown in Tables 2 to 7.

[Lateral Deviation]

In the flight distance test, the directionality of the hit ball was also simultaneously measured. Variation in a shot in a lateral direction for each of the clubs was measured. The smaller the lateral deviation is, the better the directional stability of the hit ball is. The average values of the variations in the golf players are shown in Tables 2 to 7.

[Ball Hitting Feeling]

In the flight distance test, questionnaire investigation for the ball hitting feeling was also simultaneously conducted. Each of the testers evaluated the ball hitting feeling at five stages of a score of one to five. The higher the score is, the better the ball hitting feeling is. The average values of the evaluation scores of the golf players are shown in Tables 2 and 7. The figures below the decimal point are rounded off in the average values.

As shown in Tables 2 to 7, comprehensively, the examples are highly evaluated as compared with the comparative examples. The advantages of the present invention are apparent.

The shaft described above can be used for all golf clubs.

The description hereinabove is merely for an illustrative example, and various modifications can be made in the scope not to depart from the principles of the present invention.

What is claimed is:

1. A golf club shaft comprising:
 a bias layer; and
 a straight layer,
 wherein the bias layer includes a butt partial bias layer arranged at a butt end side of the shaft;
 the straight layer includes a tip partial straight layer arranged at a tip side of the shaft and a butt partial straight layer arranged at the butt end side of the shaft;
 if a layer in which an elastic modulus of a reinforcing fiber is equal to or less than 20 ton/mm$^2$ is defined as a low-elastic layer,
 the tip partial straight layer includes a tip low-elastic layer, and the butt partial straight layer includes a butt low-elastic layer; and
 a shaft length Ls is equal to or less than 41 inches,
 wherein the tip low-elastic layer and the butt low-elastic layer are glass fiber reinforced layers; and
 if a total weight of the glass fiber reinforced layers is defined as Wg, and a shaft weight is defined as Ws, Wg/Ws is less than 0.10.

2. The golf club shaft according to claim 1, wherein an axial direction distance Lg between a tip of the shaft and a center of gravity of the shaft is 400 mm or greater and 750 mm or less; and
 a shaft weight Ws is equal to or less than 65 g.

3. A golf club comprising:
 a head;
 a shaft; and
 a grip,
 wherein the shaft includes a bias layer and a straight layer;
 the bias layer includes a butt partial bias layer arranged at a butt end side of the shaft;
 the straight layer includes a tip partial straight layer arranged at a tip side of the shaft and a butt partial straight layer arranged at the butt end side of the shaft;
 if a layer in which an elastic modulus of a reinforcing fiber is equal to or less than 20 ton/mm$^2$ is defined as a low-elastic layer,
 the tip partial straight layer includes a tip low-elastic layer, and the butt partial straight layer includes a butt low-elastic layer; and
 a shaft length Ls is equal to or less than 41 inches,
 wherein the tip low-elastic layer and the butt low-elastic layer are glass fiber reinforced layers; and
 if a total weight of the glass fiber reinforced layers is defined as Wg, and a shaft weight is defined as Ws, Wg/Ws is less than 0.10.

4. The golf club shaft according to claim 1, wherein if an axial direction distance between a tip of the shaft and a center of gravity of the shaft is defined as Lg, and a length of the shaft is defined as Ls,
 Lg/Ls is 0.37 or greater and 0.81 or less.

5. A golf club shaft comprising:
 a bias layer; and
 a straight layer,
 wherein the bias layer includes a butt partial bias layer arranged at a butt end side of the shaft;
 the straight layer includes a tip partial straight layer arranged at a tip side of the shaft and a butt partial straight layer arranged at the butt end side of the shaft;
 if a layer in which an elastic modulus of a reinforcing fiber is equal to or less than 20 ton/mm$^2$ is defined as a low-elastic layer,
 the tip partial straight layer includes a tip low-elastic layer, and the butt partial straight layer includes a butt low-elastic layer; and
 a shaft length Ls is equal to or less than 41 inches,
 wherein the tip low-elastic layer and the butt low-elastic layer are glass fiber reinforced layers; and
 if a portion between a position separated by 90 mm from a tip of the shaft and the tip of the shaft is defined as a specific tip end part;
 a portion between a position separated by 50 mm from a butt end of the shaft and the butt end of the shaft is defined as a specific butt end part;
 a weight of the specific tip end part is defined as Wt;
 a weight of the specific butt end part is defined as Wb;
 a weight of the tip low-elastic layer in the specific tip end part is defined as Wt1; and
 a weight of the butt low-elastic layer in the specific butt end part is defined as Wb1,
 Wb1/Wb is greater than Wt1/Wt.

6. A golf club shaft comprising:
a bias layer; and
a straight layer,
wherein the bias layer includes a butt partial bias layer arranged at a butt end side of the shaft;
the straight layer includes a tip partial straight layer arranged at a tip side of the shaft and a butt partial straight layer arranged at the butt end side of the shaft;
if a layer in which an elastic modulus of a reinforcing fiber is equal to or less than 20 ton/mm$^2$ is defined as a low-elastic layer,
the tip partial straight layer includes a tip low-elastic layer, and the butt partial straight layer includes a butt low-elastic layer; and
a shaft length Ls is equal to or less than 41 inches,
wherein the tip low-elastic layer and the butt low-elastic layer are glass fiber reinforced layers; and
if a portion between a position separated by 90 mm from a tip of the shaft and the tip of the shaft is defined as a specific tip end part;
a portion between a position separated by 50 mm from a butt end of the shaft and the butt end of the shaft is defined as a specific butt end part;
a weight of the specific tip end part is defined as Wt;
a weight of the specific butt end part is defined as Wb;
a weight of the tip low-elastic layer in the specific tip end part is defined as Wt1; and
a weight of the butt low-elastic layer in the specific butt end part is defined as Wb1,
Wt1/Wt is 0.05 or greater and 0.20 or less, and
Wb1/Wb is 0.07 or greater and 0.25 or less.

* * * * *